United States Patent [19]

Weiss

[11] 4,170,733

[45] Oct. 9, 1979

[54] MONITORING NUCLEAR RADIATION MEASURING CHANNELS

[75] Inventor: Harald Weiss, Vienna, Austria

[73] Assignee: Hartmann & Braun Aktiengesellschaft, Frankfurt am Main, Fed. Rep. of Germany

[21] Appl. No.: 820,147

[22] Filed: Jul. 29, 1977

[30] Foreign Application Priority Data

Jul. 31, 1976 [DE] Fed. Rep. of Germany ....... 2634590

[51] Int. Cl.² .......................... G01T 1/18; H01J 39/28; G01R 31/12
[52] U.S. Cl. ..................................... 250/374; 250/388; 324/54
[58] Field of Search ................ 250/374, 375, 388, 395

[56] References Cited

U.S. PATENT DOCUMENTS 3,221,165  11/1965  Goodale et al. ...................... 250/374

Primary Examiner—Alfred E. Smith
Assistant Examiner—Janice A. Howell
Attorney, Agent, or Firm—Smyth, Pavitt, Siegemund, Jones & Martella

[57] ABSTRACT

Measuring channels with ionization detectors as primary input are supervised by monitoring any imbalance between AC and DC components of the measuring currents, primarily to detect insulation failure of the connecting cable on account of heavy radiation and thermal losses. Detection of the imbalance is independent from radiation changes to be measured.

7 Claims, 2 Drawing Figures

MONITORING NUCLEAR RADIATION MEASURING CHANNELS

BACKGROUND OF THE INVENTION

The present invention relates to continuously monitoring the function of nuclear radiation measuring channels.

Nuclear reactors are extensively equipped with measuring and protective equipment and combinations thereof. Such equipment includes, for example, multiple radiation detection and measuring channels, each having an ionization chamber. A typical channel is for example provided for measuring the power of the reactor for various reasons, last but not least for reasons of safety. Such a measuring channel must be quite reliable and, therefore, its proper functioning has to be supervised.

Ionization chambers used for measuring nuclear radiation are, for example, disclosed in principle as well as in regard to circuit details in "Strahlung und Strahlungsmeβtechnik in Kernkraftwerken", Elitera 1974, pages 118, 119, FIGS. 3/1, 3/2, 3/3. Ionization chambers of that type are, for example, disposed in between the fuel element bundles in the core of the reactor. The ionization chambers operate in principle in that they detect the electric current resulting from the movement of ions produced by the nuclear radiation. This current is used as a criterium for the intensity of the radiation to be measured.

Considering a measuring channel, only the ionization chamber thereof being so to speak the front-end element, is exposed directly to the radiation. Accordingly, electrical conductors and cables are run between that ionization chamber in the reactor core and e.g. a console, panel or display board. These cables are, for example, insulated with a ceramic material. It is inherent that at least a portion of that cable is subjected extensively to nuclear radiation. Also, the thermal load on these cables is quite high. It was found that on a long term basis, these thermal and radiation load conditions reduce the insulating resistance of the cable. Also, such ceramic insulation is quite sensitive against penetration of moisture; already very small quantities of moisture penetrating the ceramic reduces drastically the insulative strength of that cable. The invention is not concerned with cable engineering, but is based on cognizance of these conditions and problems.

It was observed that these various interferences produce a leakage current in the cable which may become as large as the signal and measuring current from the ionization chamber so that, on one hand, these currents are no longer distinguishable and on the other hand, the measured resultant current is quite incorrect. It can readily be seen that particularly for reasons of safety such a condition is intolerable.

The literature citation introduced above mentions particularly on page 172 test equipment generally for recognizing dangerous operating conditions. This test equipment includes particularly insulation measuring devices. However, they include inherently high voltage components and DC amplifier units and such components are quite expensive and occupy significant amounts of space.

DESCRIPTION OF THE INVENTION

It is an object of the present invention to provide a new method and equipment for recognizing defects and interference in measuring channels for measuring nuclear radiation, for example, on account of insulation failure within the channel.

In accordance with the preferred embodiment of the present invention, proper functioning of such a measuring channel furnishing an output current which is representative of picked up nuclear radiation is to include a circuit for separating DC and AC component from the output current having both such components; at least one of these components is adjusted to obtain a particular relationship of the components under operating conditions of the measuring channel regarded as normal, and comparing means are connected to receive the so adjusted components to provide an indication of a deviation from that particular relationship on account, for example, of interference in the measuring channel. The invention is based on the fact that both, AC and DC components of that current, are independently representative of the nuclear radiation as picked up by the ionization chamber of the channel, but e.g. partial insulation failure affects these components differently.

In the preferred form of practicing the invention, the AC component is squared and averaged so that as far as the signal is concerned, it is also represented as DC signal. The true DC component is duly amplified and one of these DC signals is adjusted towards equality under normal operating conditions. A comparator will respond to inequality attributed, for example, to failure in the measuring channel including, but not necessarily being limited to insulation failure as one possible abnormality. The two branches include preferably amplifier means which convert the output current before or after the separation into voltage signals so that the comparison is carried out on the basis of comparing voltages. The invention is based on the fact that fluctuations in the radiation will affect the two branches equally so that the comparator will not respond, while imbalance in the branches can be regarded as an error indicator independant from the actual measuring output.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
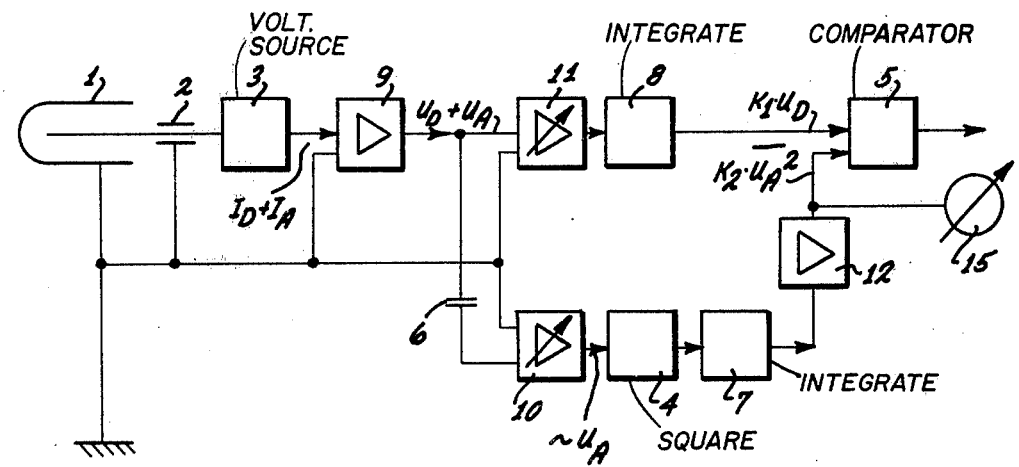
FIG. 1 is a block diagram of the monitoring circuit in accordance with the preferred embodiment of the present invention.

Proceeding now to the detailed description of the drawings, the figures show an ionization chamber 1 of conventional design and being placed, for example, within the core of a nuclear reactor. A coaxial or shielded cable 2 connects that chamber 1 with externally positioned equipment being disposed outside of the reactor core. The cable 2 is of a known variety including the above mentioned, ceramic clad cable.

Reference numeral 3 denotes a high voltage source powering the ionization chamber and providing an externally available current which represents the ionization current of and through the system 1, 2, and 3, including, however, any superimposed current as the result of partial insulation failure or leakage, or other defects establishing abnormal conditions. The system or subsystem 1, 2, and 3 can be regarded as the measuring channel, the proper function of which is to be supervised and the sum of these two currents mentioned above is the output of that measuring channel.

The output current is composed of an alternating component $I_a(t)$ being superimposed upon a DC component $I_d$. The combined measuring current $I_a+I_d$ is amplified by an amplifier stage 9 producing correspondingly an output voltage which can be described as $U_a+U_d$ wherein the indices a and d denote also here alternating and DC components. It is conceivable that the amplifier 9 is regarded as being included in the measuring channel in which case the output signal of the channel is, in fact, a voltage.

The amplifier 9 has its output coupled via a capacitor 6 to an AC amplifier 10 whose output is equal to or proportional to the voltage $U_d$. That output is fed to a squaring circuit 4 which in turn feeds an integrator 7 or an averaging stage. This averaged signal is additionally amplified in an amplifier 12; the output of the latter being described as $K_2 \times \overline{U_a^2}$. Herein $K_2$ denotes the resulting gain of all the various stages particularly of the amplification stages 10 and 12, and the line denotes the averaging operation undertaken by the integrator 7.

The second branch of the circuit includes the DC amplifier 11 and integrator 8 in order to provide for an averaged DC component commensurate with the averaging operation in the AC branch. Integrator 8 eliminates in effect the AC component because by definition the AC component is defined as the variable component with zero average. The output of stage 8 can be described as $K_1 U_d$, wherein $K_1$ denotes the resulting gain of this DC branch of the circuit. The integrating time constant should be comparable to that of integrator 7, because the frequency spectrum covered by the averaging is about the same.

The signal $K_1 U_d$ is compared with the output signal of amplifier 12 in a comparator possibly being a differential amplifier 5. The output of the amplifier 5 denotes any specific imbalance among its two inputs to be described more fully below.

The device of FIG. 1 operates on the basis of the following underlying principle as known per se, namely that the output current as extractable from an ionization chamber is, indeed, composed of an alternating component $I_a$ and of a DC component such as $I_d$. In accordance with Campbell's theorem, the squared AC component is proportional to the radiation intensity to which the ionization chamber responds. The DC component is, of course, also proportional to that radiation intensity. The radiation intensity in either case is proportional to the power output P of the reactor. Thus, the following relation is valid $$P = K \times I_a(t)^2$$

wherein K is a constant factor of proportionality.

Now, in the illustrated circuit, amplifier 9 provides, at first, an amplified and converted voltage signal $U_a+U_d$ representing both of the two components. The circuit elements 11 and 8 produce a signal that represents directly the DC component of the measuring channel; the signal being produced is $K_1 \times U_d$; elements 6, 10, 4, and 7, operating in that sequence, produce a signal that represents the squared and averaged AC component of the measuring channel, being expressed as $K_2 \times \overline{U_a^2}$. That signal is also a DC signal due to squaring and averaging.

Amplifiers 11 and 12, or at least one of them, should be adjustable as to their gain. Thus, either or both can be adjusted so that under specific operation conditions, deemed and defined as being normal, $K_1 U_d = K_2 \overline{U_a^2}$. Under such conditions comparator 5 will furnish zero output. The adjustment of these two signals towards equality is only one particular way of practicing the invention though clearly the preferred one. In principle, either branch could have superimposed a constant bias. Decisive for the invention is that under conditions deemed normal (the normality having been established otherwise), the two branches are adjusted to establish a particular relationship between the signals as applied from the two branches to the comparator 5, and the comparator will respond to a deviation from that particular relationship.

By way of example, and as has been outlined above, the particular measuring channel may exhibit certain failures such as insulation leakage. It was found that the leakage augments particularly the DC component $I_d$ causing that component to increase particularly in relation to the alternating component so that the comparator 5 will unbalance and will produce an output which can be used in a variety of ways. One use, for example, is the production of a warning indication; another (or additional) use is the automatic disconnection of the particular measuring channel because the particular channel has become unreliable.

It should be mentioned that either of the two components of the branches or both can be used separately as indicators for the radiation condition and reactor power as detected by the particular measuring channel. Since leakage affects the AC component to a lesser extent, that component is used here as power indicator; see instrument 15 as connected to the output of 12.

The radiation condition as picked up particularly by the ionization chamber 1 may vary but as long as the channel as such functions properly, that variation affects both channels equally so that only the readout as per instrument 15 which is a primary purpose of the ionization chamber 1 to begin with, will be used in accordance with the reactor operation. As long as the measuring channel as defined remains operational the two components remain in such a relationship that the output of comparator 5 is a "no fault" signal no matter what changes the radiation has undergone.

It should be noted further that this system as shown includes a self checking feature. Any malfunction of the elements 4, 7, 8, 10, 11, and 12 will also unbalance the comparator 5. Thus, unbalancing of comparator 5 will not just indicate insulation failure, but other malfunctions, including those of this supervising circuit itself. Subsequently, one may need a procedure to isolate the particular malfunction. Nevertheless, any such malfunction will also influence the desired readout of the measuring channel to the extent they participate therein, and are elements of such readout channels. However, any defect in amplifier 9 will go unrecognized. This latter, though minor drawback is eliminated in the modified circuit as per FIG. 2.

Figure 2:
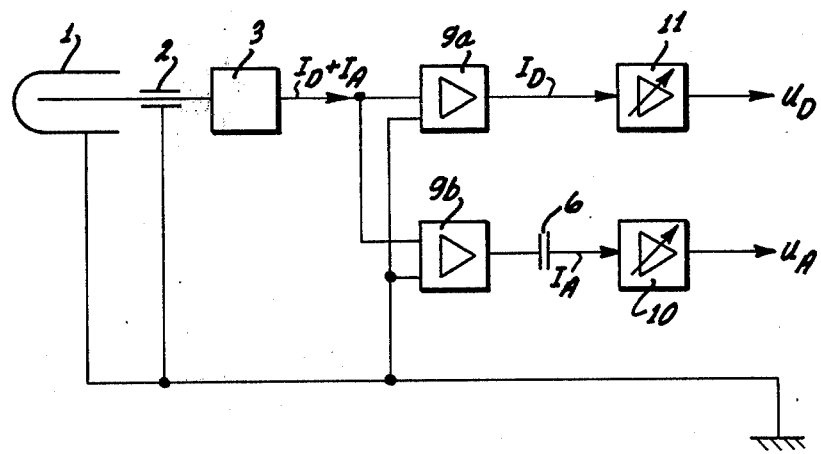
FIG. 2 is a modified detail of the diagram of FIG. 1 constituting an improvement.

As shown in FIG. 2, the conductor leading out of the high voltage source 3 is connected to two amplifiers 9a and 9b establishing at that point already the two branches. Amplifier 9a may be constructed as a DC amplifier and amplifier 9b may be constructed as an AC amplifier. The remainder of the circuit including capacitive coupling, integration, averaging, etc., is as shown in FIG. 1 except that the amplifiers 9a and 9b are current amplifiers and the conversion to suitable voltages is carried out by the two stages 10 and 11. In the alternative, that conversion could also be carried out by the amplifiers 9a and 9b which would have to be constructed accordingly, and in addition their tied together inputs would require a small, common input resistor.

It should be noted further that in either of the two examples comparator 5 may be constructed to suppress transients. In other words, the amplifier-comparator 5 should be constructed so that its output circuit ignores temporary unbalances of the two inputs. Transient effect may cause such unbalance for reasons other than insulation leakage and may be the result of "noise" or other harmless causes. Insulation leakage (and circuit component drift, etc.) is clearly a long term effect and not a transient one. Thus, circuit 5 should be designed to produce a non-zero output only after an input imbalance has persisted for a certain period of time.

The invention is not limited to the embodiments described above but all changes and modifications thereof not constituting departures from the spirit and scope of the invention are intended to be included.

I claim:

1. Apparatus for continuously monitoring proper functioning of a measuring channel for nuclear radiation furnishing an output current being representative of nuclear radiation as picked up by the measuring channel, comprising:

first means responsive to the output current and separating from each other DC and AC components thereof;

second means connected for adjusting at least one of the components to obtain a particular quantitative relationship of the components, for operating conditions of the measuring channel regarded as normal in which said components vary correspondingly to each other upon variation of the picked up nuclear radiation; and third means connected to receive the components as adjusted and providing an indication of a deviation from the particular relationship on account of interference in the channel resulting in a change of at least one of the components in the output current by an abnormal condition such as insulation failure in the channel.

2. Apparatus as in claim 1 wherein the first means includes two circuit branches, one for AC, and one for DC, at least one of the branches including an adjustable amplifier.

3. Apparatus as in claim 2, wherein the AC branch includes means for squaring the AC component and means for averaging the square component.

4. Apparatus as in claim 1 wherein the third means is constructed to suppress transient deviations from the particular relation.

5. Method of continuously monitoring proper functioning of a measuring channel for nuclear radiation, comprising the steps of separating a DC component of a channel output from an AC component of that output;

adjusting the components to a particular quantitative relationship between each other, for a normally operational state; and detecting a quantitative deviation from the said particular relationship as adjusted.

6. A method as in claim 5 wherein the detecting step includes suppressing transient deviations from the particular relation.

7. Method as in claim 5 wherein the separated AC component is subjected to squaring and averaging, the detecting step involving comparing the DC component with the squared and averaged AC component.

* * * * *